(12) United States Patent
Bar-Niv et al.

(10) Patent No.: US 12,476,842 B2
(45) Date of Patent: Nov. 18, 2025

(54) DIRECT ENCAPSULATION OF SENSOR DATA OVER ETHERNET

(71) Applicant: MARVELL ASIA PTE LTD, Singapore (SG)

(72) Inventors: Amir Bar-Niv, Sunnyvale, CA (US); Dance Wu, Palo Alto, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 197 days.

(21) Appl. No.: 18/113,094

(22) Filed: Feb. 23, 2023

(65) Prior Publication Data

US 2023/0269112 A1 Aug. 24, 2023

Related U.S. Application Data

(60) Provisional application No. 63/313,291, filed on Feb. 24, 2022.

(51) Int. Cl.
*H04L 12/40* (2006.01)

(52) U.S. Cl.
CPC .. *H04L 12/40091* (2013.01); *H04L 12/40071* (2013.01); *H04L 2012/40273* (2013.01)

(58) Field of Classification Search
CPC ......... H04L 12/40091; H04L 12/40071; H04L 12/40169; H04L 2012/40273
See application file for complete search history.

(56) References Cited

U.S. PATENT DOCUMENTS

| | | | | |
|---|---|---|---|---|
| 11,654,938 | B1* | 5/2023 | Kumar | B60W 60/0053 701/23 |
| 2019/0306287 | A1* | 10/2019 | Kniplitsch | H04L 69/324 |
| 2020/0059438 | A1* | 2/2020 | Ogawa | H04L 47/74 |
| 2023/0021603 | A1* | 1/2023 | Ichimaru | B60R 16/023 |
| 2023/0379186 | A1* | 11/2023 | Kim | H04L 12/40006 |

FOREIGN PATENT DOCUMENTS

| | | |
|---|---|---|
| CN | 106961437 A | 7/2017 |
| CN | 112272132 B | 3/2021 |
| KR | 102125875 B1 | 6/2020 |

OTHER PUBLICATIONS

IEEE Standard 1722-2016, "IEEE Standard for a Transport Protocol for Time-Sensitive Applications in Bridged Local Area Networks", pp. 1-233, Dec. 7, 2016.

(Continued)

*Primary Examiner* — Rasheed Gidado
(74) *Attorney, Agent, or Firm* — Meitar Patents Ltd.; Daniel Kligler

(57) ABSTRACT

A sensor bridge, for use in an Ethernet network in a vehicle, includes a sensor interface, a mapper and a communication processor. The sensor interface is configured to receive sensor data from a sensor installed in the vehicle. The mapper is configured to form mapped sensor data by applying to the sensor data a direct mapping that maps specified parts of the sensor data to corresponding bit positions in one or more Ethernet packets. The communication processor is configured to generate the one or more Ethernet packets including the mapped sensor data, and to transmit the one or more Ethernet packets over the Ethernet network.

8 Claims, 3 Drawing Sheets

(56) References Cited

OTHER PUBLICATIONS

MIPI Alliance, Inc., "Errata 01 for MIPI CSI-2 Specification (Camera Serial Interface 2) Specification Version 2.1," pp. 1-290, Apr. 26, 2018.
IEEE P802.3cy/D3.2, "Draft Standard for Ethernet—Amendment 8: Physical Layer Specifications and Management Parameters for 25 GB/s Electrical Automotive Ethernet", pp. 1-141, year 2023.
IEEE 802.3ch-2020, "IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207, Jun. 4, 2020.
MIPI Alliance, Inc., "Mipi Alliance Specification for D-PHY", pp. 1-234, version 2.5, Jul. 5, 2019.
International Application # PCT/IB2023/051664 Search Report dated Apr. 25, 2023.
Bar-Niv et al., U.S. Appl. No. 18/168,595, filed Feb. 14, 2023.

* cited by examiner

DIRECT ENCAPSULATION OF SENSOR DATA OVER ETHERNET

CROSS-REFERENCE TO RELATED APPLICATIONS

This application claims the benefit of U.S. Provisional Patent Application 63/313,291, filed Feb. 24, 2022, whose disclosure is incorporated herein by reference.

FIELD OF THE DISCLOSURE

The present disclosure relates generally to sensor and packet networks, and particularly to methods and systems for transmitting sensor data over packet networks.

BACKGROUND

Various communication systems and applications, such as automotive systems, involve transmission of media such as audio and video over a packet network. One example protocol for transmission of audio and video over Ethernet networks is specified, for example, in IEEE Standard 1722-2016, entitled "IEEE Standard for a Transport Protocol for Time-Sensitive Applications in Bridged Local Area Networks," December, 2016.

Various interfaces can be used to connect to sensors such as cameras and radars. An example of an interface between image sensors and application processors is the MIPI Camera Serial Interface 2 (CSI-2) interface, which is specified in "Errata 01 for MIPI CSI-2 Specification (Camera Serial Interface 2) Specification Version 2.1," April, 2018.

The description above is presented as a general overview of related art in this field and should not be construed as an admission that any of the information it contains constitutes prior art against the present patent application.

SUMMARY

An embodiment that is described herein provides a sensor bridge for use in an Ethernet network in a vehicle. The sensor bridge includes a sensor interface, a mapper and a communication processor. The sensor interface is configured to receive sensor data from a sensor installed in the vehicle. The mapper is configured to form mapped sensor data by applying to the sensor data a direct mapping that maps specified parts of the sensor data to corresponding bit positions in one or more Ethernet packets. The communication processor is configured to generate the one or more Ethernet packets including the mapped sensor data, and to transmit the one or more Ethernet packets over the Ethernet network.

In some embodiments, the mapper is further configured to add to the mapped sensor data, at specified positions, routing information for routing the one or more Ethernet packets in the Ethernet network. Additionally or alternatively, the mapper is further configured to add to the mapped sensor data, at specified positions, Operations, Administration and Management (OAM) information for transmission in the one or more Ethernet packets.

In an embodiment, the mapper is configured to map the sensor data with a latency that does not exceed one microsecond. In a disclosed embodiment, the sensor bridge further includes a memory buffer, and the mapper is configured to populate the memory buffer with the received sensor data in accordance with the direct mapping, and to output the mapped sensor data from the memory buffer.

There is additionally provided, in accordance with an embodiment that is described herein, a method for transmitting sensor data in an Ethernet network in a vehicle. The method includes receiving sensor data from a sensor installed in the vehicle. Mapped sensor data is formed by applying to the sensor data a direct mapping that maps specified parts of the sensor data to corresponding bit positions in one or more Ethernet packets. The one or more Ethernet packets, including the mapped sensor data, are generated and transmitted over the Ethernet network.

The present disclosure will be more fully understood from the following detailed description of the embodiments thereof, taken together with the drawings in which:

DETAILED DESCRIPTION OF EMBODIMENTS

Figure 1:
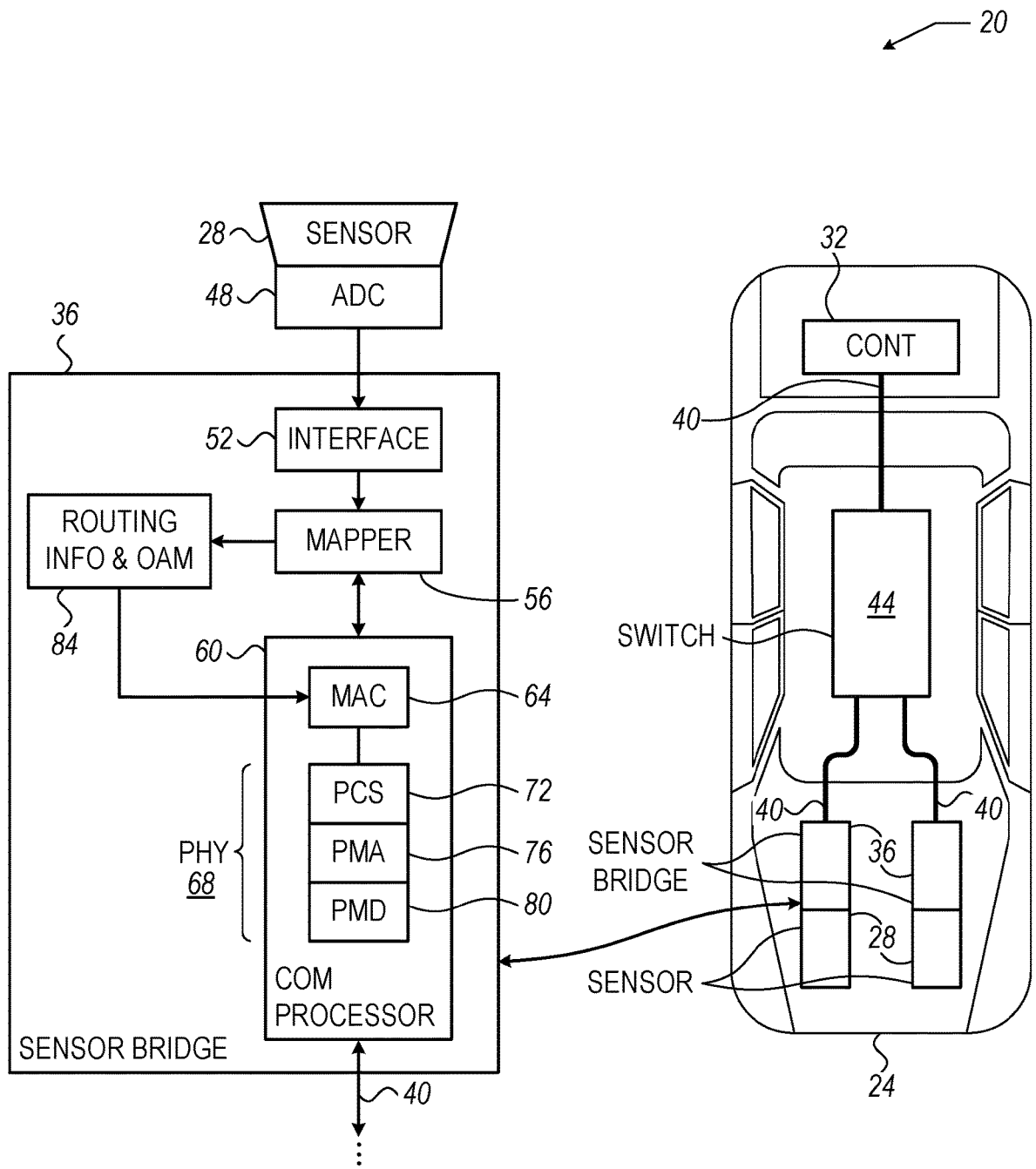
FIG. 1 is a block diagram that schematically illustrates an automotive Ethernet communication system, in accordance with an embodiment that is described herein.

In many applications that involve transmission of sensor data over a packet network, small latency is a prime consideration. Consider, for example, an automotive system that collects data from cameras, radars, lidars and other sensors for analysis by a central processor. In such an environment, it is highly important to analyze the data, e.g., to identify safety hazards, as rapidly as possible. Minimizing latency in such a system can directly impact driver safety.

In current solutions, one of the major sources of latency is the interface between the sensor and the network, i.e., the latency incurred by the process of receiving the sensor data and converting it into communication packets. Embodiments that are described herein reduce this latency considerably using direct mapping techniques to directly map sensor data to communications packets. The disclosed techniques also reduce the size, cost and power consumption of the hardware needed for converting sensor data into communication packets.

The embodiments herein are described in the context of an Ethernet network in a vehicle, by way of example. The disclosed techniques, however, are not limited to any particular network type or protocol and can be used in any other network environment that requires small latency, for example in industrial control networks. The terms "packets" and "frames" are used interchangeably throughout the present disclosure.

In some embodiments, the system comprises a sensor bridge, which connects a sensor to an Ethernet network. The sensor comprises a sensor interface, a mapper and a communication processor. The sensor interface receives sensor data from the sensor. The mapper applies a predefined mapping that maps specified parts of the sensor data to respective bit positions in one or more Ethernet frames. The communication processor carries out both Medium Access Control layer (MAC) and Physical Layer (PHY) functions, so as to generate Ethernet frames that comprise the mapped sensor data. The Ethernet frames are transmitted over the network.

In some embodiments, the sensor interface receives the sensor data from the sensor in raw form, e.g., video data, radar data, lidar data and/or audio data that was digitized by an Analog-to-Digital Converter (ADC) coupled to the sensor. The sensor data is typically received over a high-speed parallel or serial bus.

The mapper uses a predefined mapping that maps specified parts of the sensor data to respective bit positions in one or more Ethernet frames. For example, in the case of a video camera, the sensor data comprises video data and related signaling (control signals). The mapping may specify bit positions in the Ethernet frames for signaling such as frame start, frame end, line start, line end, horizontal and vertical sync, for metadata such as timestamps, as well as for the actual video pixel values. In the present context, a mapping that maps specified parts of sensor data to respective bit positions in one or more communication frames is referred to herein as a direct mapping.

In some embodiments, the mapping performed by the mapper is also direct in the sense that it requires only a single write operation into a memory buffer and a single read operation from the memory buffer. In order to enable direct mapping, in such an implementation the mapper comprises a memory buffer that is preconfigured according to the format of the Ethernet frames. The mapper populates the buffer with sensor data as the sensor data is being streamed from the sensor interface, by writing the various parts of the sensor data into corresponding locations in the buffer, as specified by the mapping.

By using the direct mapping techniques described herein, the latency of the sensor bridge (from the time a certain bit of the sensor data is received at the sensor interface to the time at which the same bit is transmitted to the network in an Ethernet frame) can be reduced considerably. In an implementation, the latency of the mapper typically is reduced to below 1 psec. The disclosed techniques also reduce the size, cost and power consumption of the sensor bridge.

FIG. 1 is a block diagram that schematically illustrates an automotive Ethernet communication system 20, in accordance with an embodiment that is described herein. In the embodiment described herein, system 20 is installed in a vehicle 24, and comprises multiple sensors 28 that communicate with, and are controlled by, a controller 32. Controller 32 is also referred to herein as a central processor or central computer. In other embodiments (not seen), system 20 may be installed in an industrial network, surveillance network or other suitable network that involves transmitting sensor data over a network.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like. Controller 32 may comprise any suitable type of processor, e.g., a CPU or a GPU.

Sensors 28 and controller 32 communicate via an Ethernet network comprising multiple network links 40 and one or more Ethernet switches 44. Ethernet links 40 may comprise, for example, twisted-pair cables. Sensors 28 connect to the Ethernet network via one or more sensor bridges 36. A given sensor bridge may connect a single sensor or multiple sensors to the Ethernet network. Sensor bridges 36, switches 44 and controller 32 may communicate over network links 40 at any suitable bit rate. Example bit rates are 2.5 Gb/s, 5 Gb/s or 10 Gb/s, in accordance with the IEEE 802.3ch-2020 standard, and Gb/s in accordance with the IEEE 802.3cy standard.

An inset on the left-hand side of FIG. 1 illustrates an example implementation of sensor bridge 36, in an embodiment. In the present example, a sensor 28 outputs analog sensor data, e.g., analog video. Sensor 28 is coupled to an Analog-to-Digital Converter (ADC) 48 that digitizes the analog sensor data and outputs digitized sensor data.

Sensor bridge 36 comprises a sensor interface 52 that receives the digitized sensor data. The received sensor data comprises various parts of different types, for example media (e.g., video pixel values in case of video, radar or lidar media in case of radar or lidar, etc.), signaling (e.g., synchronization markers that mark the beginnings and ends of lines and frames), metadata, Operations Administration and Maintenance (OAM) data, and/or any other suitable data type. Sensor interface 52 and ADC 48 typically communicate over a 16-bit or 24-bit parallel bus.

Sensor bridge 36 further comprises a mapper 56 and a communication processor 60. Mapper 56 maps the sensor data directly onto Ethernet frames using techniques that are described in detail below. Mapper 56 produces MAC frames that are provided to communication processor 60.

Communication processor 60 comprises a MAC processor 64 that implements the Ethernet MAC layer, and a PHY processor 68 that implements the Ethernet PHY layer. PHY processor 68 comprises a Physical Coding Sublayer (PCS) module 72, a Physical Medium Attachment (PMA) module 76 and a Physical Medium Dependent (PMD) module 80, which implemented the Ethernet PCS, PMA and PMD sublayers, respectively. The resulting Ethernet frames are sent over a suitable Ethernet link 40, e.g., to switch 44.

In some embodiments, sensor bridge 36 further comprises a routing info and OAM module 84, which inserts routing information and/or OAM data into the MAC frames. Routing information and/or OAM data may be added at any specified positions in the MAC frames relative to the mapped sensor data. The routing information may comprise, for example, a Source Address (SA) and a Destination Address (DA) of the Ethernet frames, a Virtual Local Area Network (VLAN) value to be assigned to the Ethernet frames, a priority (or other Quality-of-Service indication) for the Ethernet frames, a length of the Ethernet packet, and/or any other suitable parameter that is used in subsequent routing of the Ethernet frames via the network. OAM information may comprise, for example, diagnostics data, control information for controlling remote General-Purpose Input-Output (GPIO) ports or control data read from local GPIO ports, control data and commands for remote register access, etc. Additionally, or alternatively, in some embodiments sensor bridge 36 may insert into the MAC frames information such as authentication data and/or encryption keys.

In some embodiments, routing info and OAM module 84 is programmable, locally and/or remotely, to generate and insert suitable information into the MAC frames. In an embodiment, sensor bridge 36 comprises a dedicated state machine that defines the timing of insertion, e.g., when to insert sensor data and when to insert routing and/or OEM information.

Figure 2:
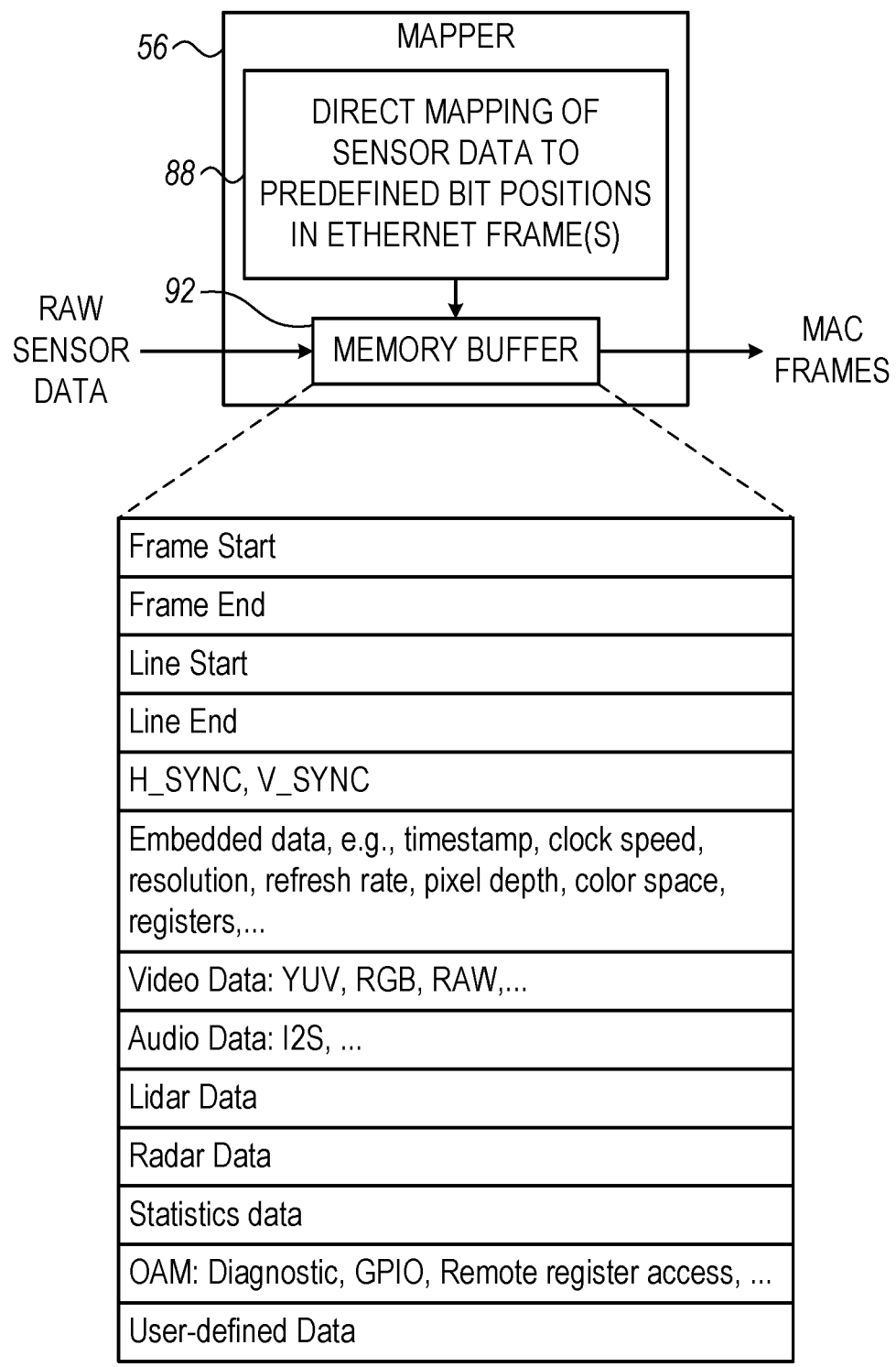
FIG. 2 is a block diagram that schematically illustrates a mapper in a sensor bridge of the system of FIG. 1, in accordance with an embodiment that is described herein.

FIG. 2 is a diagram that schematically illustrates mapper 56 in sensor bridge 36 of system 20, in accordance with an embodiment that is described herein. In the present example, mapper 56 stores a direct mapping 88, which maps specified parts of the sensor data to corresponding bit positions in one or more Ethernet frames. Mapper 56 comprises a memory buffer 92 that is organized in accordance with mapping 88.

In some embodiments, buffer 92 has predefined memory locations (e.g., addresses) that are designated to store corresponding parts of the sensor data. In an embodiment, the designated memory locations in buffer 92 are ordered in the same order as the order of fields in the MAC frames that will be supplied from mapper 56 to MAC processor 64 (see FIG. 1). In one embodiment, the format of the MAC frames, and thus the configuration of buffer 92, complies with the IEEE 1722-2016 standard, cited above.

A list of fields at the bottom of FIG. 2 illustrates one non-limiting example mapping of this sort. In this example embodiment, the specified parts of the sensor data include:

Synchronization markers, such as frame-start, frame-end, line-start, line-end, horizontal sync (H_SYNC) and vertical sync (V_SYNC).

Embedded data, such as a timestamp indicating the time at which the sensor data was captured, a clock speed of the sensor interface, video parameters (e.g., resolution, refresh rate, pixel depth, color space), and register values.

Media content, depending on the sensor type (e.g., Video data in a suitable format such as YUV, RGB or RAW, audio data is a suitable format such as Inter-IC Sound ($I^2S$), lidar data or radar data).

Statistics data calculated over the media content, e.g., a video frame histogram.

OAM information, e.g., diagnostics data, control information for controlling remote GPIO ports or control data read from local GPIO ports, control data and commands for remote register access, etc.

User-defined data.

The list above is depicted solely by way of example. In alternative embodiments, mapping 88 may map any other suitable parts of sensor data, and buffer 92 may be organized in any other suitable way.

In a typical mode of operation, mapper 56 receives raw sensor data on a continuous, uninterrupted basis from sensor interface 52 (FIG. 1). Mapper 56 parses the sensor data, identifies the various parts of the sensor data, and populates buffer 92 accordingly.

In some embodiments, mapping 88 also maps the routing information and/or OAM information provided by module 84 (FIG. 1) to corresponding bit positions in the Ethernet frames. As part of populating buffer 92, mapper 56 populates the appropriate locations in buffer 92 with routing information and/or OAM information.

In parallel with population of buffer 92 with incoming sensor data, mapper 88 streams MAC frames from buffer 92 to MAC processor 64 (FIG. 1). Using a direct mapping in this manner, the end-to-end latency of sensor bridge 36 (from the time a certain bit of the sensor data is received from ADC 48 by sensor interface 52, to the time at which the same bit is transmitted from sensor bridge 36 to the network in an Ethernet frame) is typically on the order of 1 μsec.

Figure 3:
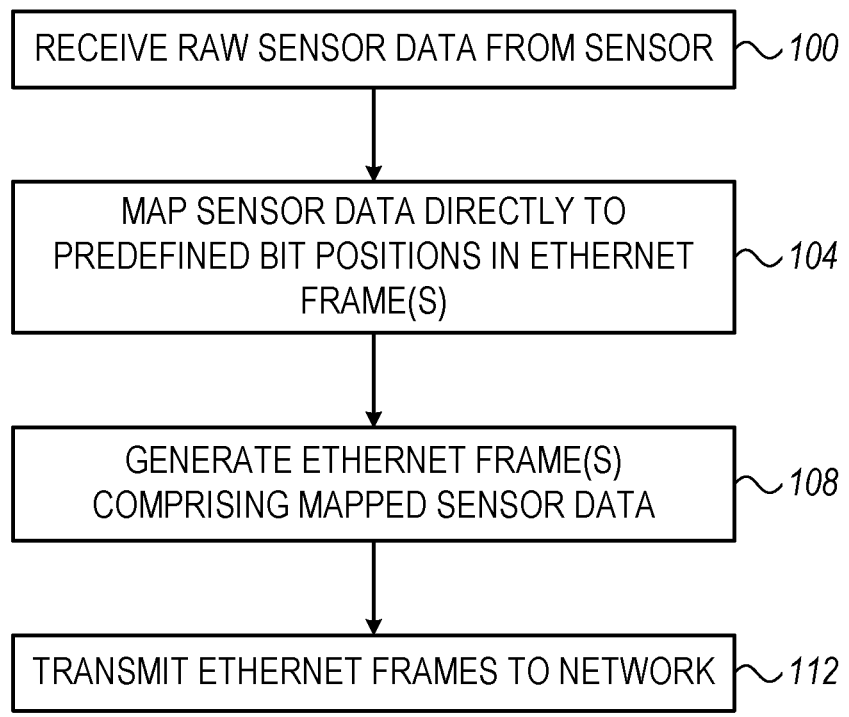
FIG. 3 is a flow chart that schematically illustrates a method for direct mapping of sensor data onto Ethernet frames, in accordance with an embodiment that is described herein.

FIG. 3 is a flow chart that schematically illustrates a method for direct mapping of sensor data onto Ethernet frames, in accordance with an embodiment that is described herein. In an embodiment, the method is carried out by sensor bridge 36.

The method begins with sensor interface 52 receiving raw digitized sensor data from ADC 48, at an input operation 100. At a mapping operation 104, mapper 56 maps specified parts of the sensor data (e.g., the parts listed in FIG. 2 above) to predefined bit positions in one or more Ethernet frames, in accordance with mapping 88. Mapper 56 sends the resulting MAC frames to communication processor 60.

At an Ethernet frame generation operation 108, communication processor 60 generates one or more Ethernet frames comprising the directly-mapped sensor data. At a transmission operation 112, communication processor 60 transmits the Ethernet frames over link 40.

The configurations of system 20, sensor bridge 36 and mapper 56, shown in FIGS. 1 and 2, and the method description of FIG. 3, are example configurations that are depicted solely for the sake of clarity. In alternative embodiments, any other suitable configurations can be used. The various elements of system 20, sensor bridge 36 and mapper 56 may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions of system 20, sensor bridge 36 and mapper 56 may be implemented in software and/or using a combination of hardware and software elements. Elements that are not mandatory for understanding of the disclosed techniques have been omitted from the figure for the sake of clarity.

In some embodiments, some functions of system 20, sensor bridge 36 and/or mapper 56 may be implemented in one or more programmable processors, e.g., one or more Central Processing Units (CPUs), microcontroller and/or Digital Signal Processors (DSPs), which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Although the embodiments described herein mainly address automotive networks, the methods and systems described herein can also be used in other applications that involve transfer of video over a network, such as in security-camera applications, industrial monitoring camera applications, and many others.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A sensor bridge for use in an Ethernet network in a vehicle, the sensor bridge comprising:
   a sensor interface, configured to receive sensor data from a sensor installed in the vehicle;
   a mapper, configured to:
      hold a direct mapping that maps specified parts of the sensor data to corresponding bit positions in one or more Ethernet packets; and
      populate a memory buffer with the received sensor data in accordance with the direct mapping, wherein the memory buffer is preconfigured according to a format of the Ethernet packets and has respective memory locations designated to buffer the specified parts of the sensor data; and a communication processor, configured to generate the one or more Ethernet packets comprising the sensor data buffered in the memory buffer, and to transmit the one or more Ethernet packets over the Ethernet network.

2. The sensor bridge according to claim 1, wherein the mapper is further configured to add to the mapped sensor data, at specified positions, routing information for routing the one or more Ethernet packets in the Ethernet network.

3. The sensor bridge according to claim 1, wherein the mapper is further configured to add to the mapped sensor data, at specified positions, Operations, Administration and Management (OAM) information for transmission in the one or more Ethernet packets.

4. The sensor bridge according to claim 1, wherein the mapper is configured to map the sensor data with a latency that does not exceed one microsecond.

5. A method for transmitting sensor data in an Ethernet network in a vehicle, the method comprising:

receiving sensor data from a sensor installed in the vehicle;

holding a direct mapping that maps specified parts of the sensor data to corresponding bit positions in one or more Ethernet packets;

populating a memory buffer with the received sensor data in accordance with the direct mapping, wherein the memory buffer is preconfigured according to a format of the Ethernet packets and has respective memory locations designated to buffer the specified parts of the sensor data; and generating the one or more Ethernet packets comprising the sensor data buffered in the memory buffer, and transmitting the one or more Ethernet packets over the Ethernet network.

6. The method according to claim 5, wherein applying the direct mapping further comprises adding to the mapped sensor data, at specified positions, routing information for routing the one or more Ethernet packets in the Ethernet network.

7. The method according to claim 5, wherein applying the direct mapping further comprises adding to the mapped sensor data, at specified positions, Operations, Administration and Management (OAM) information for transmission in the one or more Ethernet packets.

8. The method according to claim 5, wherein applying the direct mapping comprises mapping the sensor data with a latency that does not exceed one microsecond.

* * * * *